United States Patent [19]

Labounty

[11] Patent Number: 4,908,946
[45] Date of Patent: Mar. 20, 1990

[54] WOOD CUTTING SHEAR

[76] Inventor: Roy E. Labounty, HC2, Box 105E, Two Harbors, Minn. 55616

[21] Appl. No.: 254,145

[22] Filed: Oct. 6, 1988

[51] Int. Cl.$^4$ .............................................. B23P 19/00
[52] U.S. Cl. ........................................ 30/134; 83/928;
 83/609; 144/3 D; 144/34 E; 144/339; 30/228; 37/117.5
[58] Field of Search ................. 83/928, 609; 144/3 D, 144/34 R, 34 E, 336, 339; 30/134, 228, 249, 258; 294/67, 88; 37/117.5

[56] References Cited

U.S. PATENT DOCUMENTS

| | | |
|---|---|---|
| Re. 26,992 | 11/1970 | Rehnstrom ........................ 144/34 E |
| 3,814,152 | 6/1974 | Pallari ................................ 144/2 |
| 4,198,747 | 4/1980 | LaBounty ........................... 30/134 |
| 4,274,457 | 6/1981 | Nilsen ............................. 144/34 E |
| 4,439,921 | 4/1984 | Ramun et al. ..................... 30/134 |
| 4,519,135 | 5/1985 | LaBounty ........................... 30/134 |
| 4,558,515 | 12/1985 | LaBounty ........................... 30/134 |
| 4,670,983 | 6/1987 | Ramun et al. ..................... 30/134 |

FOREIGN PATENT DOCUMENTS 964170 3/1975 Canada ............................. 144/34 E
2122125A 1/1984 United Kingdom .

Primary Examiner—W. Donald Bray
Attorney, Agent, or Firm—Palmatier & Sjoquist

[57] ABSTRACT

The present invention relates to heavy duty wood cutting shear attachments of a large scale for connection to a boom structure of a hydraulic excavator for cutting tree stumps and the like. The wood cutting shear includes a swingable jaw and a stationary jaw. The swingable jaw has a C-shaped frame with a knife like cutting blade affixed therein. The stationary jaw includes a stump supporting section having a blade receiving slot with a width of approximately the thickness of the cutting blade. Besides slicing through a stump placed between the jaws, the knife like blade may cooperate with the stump supporting section to shear portions of the stump being sliced.

13 Claims, 2 Drawing Sheets

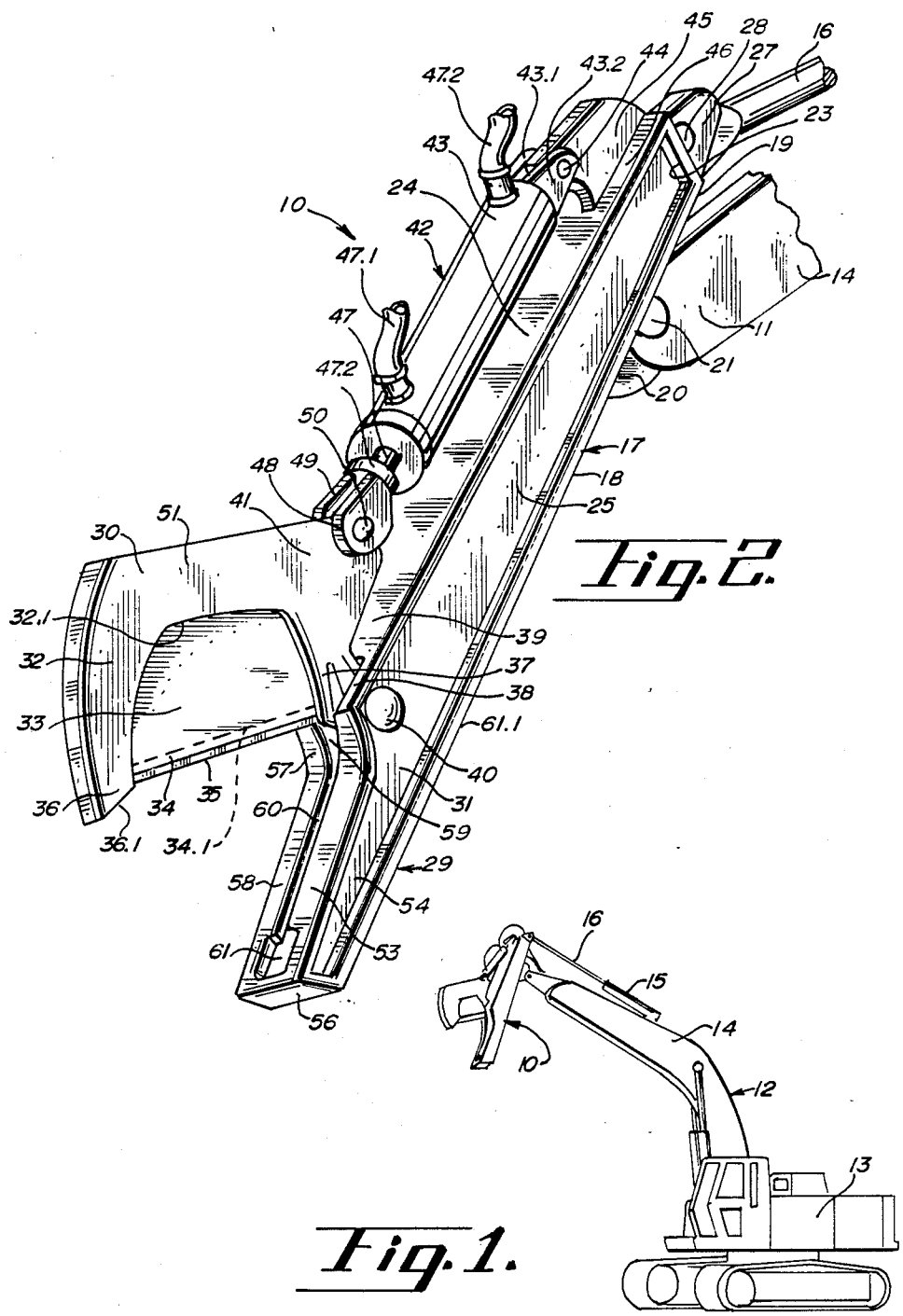

WOOD CUTTING SHEAR

This invention relates to an attachment for hydraulic excavators and more particularly to a wood cutting shear attachment for shearing tree stumps and wooden beams and the like.

BACKGROUND OF THE INVENTION

In land development operations such as road construction, it is typical for the land to be deforested by utilizing a bulldozer to uproot and knock trees down. Uprooted tree stumps may be especially difficult to handle and haul away.

SUMMARY OF THE INVENTION

A feature of the invention is the provision, in a heavy duty attachment for the boom structure of a hydraulic excavator, of a shear of considerable size for the cutting of stumps and scrap logs into pieces.

Another feature is the provision in such an attachment, of a swingable jaw with shearing edges for swinging into a stationary jaw with cutting edges.

Still another feature is the provision in such a shearing attachment, of a penetrating knife like edge on the swingable jaw for incising a tree stump or scrap log before the cutting edge of the swingable jaw cooperates with the cutting edges of the stationary jaw.

Still another feature of the invention is a shear attachment for the boom structure of a hydraulic excavator wherein a stationary jaw has a stump supporting plate structure with a formed slot to receive the sharpened knife or incising edge portion of the plate like blade and portions of the C-shaped blade mounting frame of the movable jaw.

An advantage of the present invention is that stumps are reduced to chunks of scrap wood of a size that may be easily handled such as by a grapple and then loaded onto a truck and hauled away.

Another advantage of the present invention is that the attachment is inexpensive and affordable for the small business road contractor.

Still another advantage of the present invention is that the attachment may be utilized as a log splitter. As the blade of the wood cutting shear slices into a log or stump parallel to the grain in the wood, the thicker C-shaped frame may act like a wedge to split the stump into two pieces before the blade slices completely through the log.

Still another advantage of the present invention is that a nose portion of the C-shaped frame which extends beyond the edge portion of the blade may be utilized to pick up and carry objects such as stumps, tree trunks, or other wooden pieces.

Still another advantage of the present invention is that the C-shaped frame maintains the blade against warping or bending by affixedly securing the entire periphery of the blade except for the cutting edge. As the cutting blade slices through a stump, forces and pressures of different directions and degrees are applied to the blade by various portions of the stump, such as knots or gnarls. The C-shaped frame allows a slight resilient warping of the thin blade in response to such pressures, but sufficiently surrounds the blade to tend to return the blade to its normal flat condition.

BRIEF DESCRIPTION OF THE DRAWINGS

FIG. 1 is a perspective view showing the wood cutting shear mounted on the boom structure of a hydraulic excavator.

FIG. 2 is an enlarged front perspective view of the wood cutting shear.

DETAILED DESCRIPTION

Figure 3:
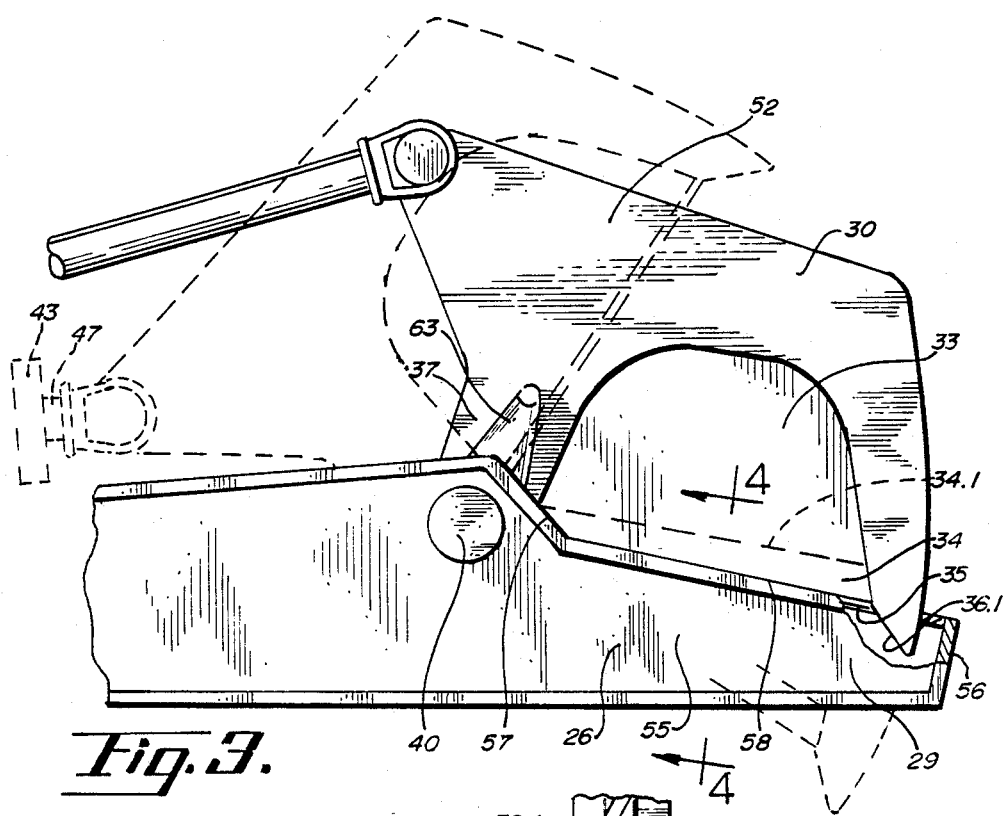
FIG. 3 is a detail side elevational view of the wood cutting shear showing the shear in closed position and also in open and rest positions in dotted lines.

As shown in FIGS. 1 and 2, a heavy duty wood cutting shear attachment 10 is adapted for mounting on a distal end portion 11 of a boom structure 12 of a hydraulic excavator 13. The boom structure 12 includes a boom 14 and a hydraulic cylinder 15 with a piston rod 16. Alternately the boom structure may include a dipper stick between the boom 12 and shear 10 and be swingably connected to both the boom and shear. The dipper stick will be controlled and positioned by the cylinder 12, and another cylinder on the dipper stick will be connected to the shear for controlling and positioning the shear.

The wood cutting shear attachment 10 includes a frame 17 having a bottom plate 18. Plate 18 has a rear end 19 to which is affixed a longitudinally mounted bottom ear 20 having a mounting pivot 21 for pivotally connecting ear 20 with distal end 11 of the boom 14.

A rear tie plate 23 traverses the rear end of frame 17 and is affixed, such as by welding, to the bottom plate 18, a framing top plate 24, and a pair of side frame plates 25 and 26. A vertically disposed rear ear 27 is rigidly affixed to rear tie plate 23 and extends rearwardly therefrom. A mounting pivot 28 pivotally connects the rear ear 27 to the piston rod 16 of the hydraulic cylinder 15. It will be recognized that mounting ears 20 and 27 may be located in various places adjacent the rear end of frame 17 to accommodate various dimensions and specifications of various hydraulic excavators 13.

The shear 10 has a jaw structure 29 including a movable front or upper jaw 30 and a stationary rear or lower jaw 31. The upper jaw 30 includes a C-shaped or partially annular jaw body or blade frame 32, and a plate like blade 33 affixed as by welding to the jaw frame 32. The jaw frame 32 has generally semi-annularly shaped inner periphery or edge portion 32.1 to which the blade 33 is welded. The inner periphery 32.1 of the jaw frame 32 is large enough to embrace most large stumps before engaging the stump as the blade edge is being incised through the stump. Typically the inner periphery 32.1 of the blade frame may be 44 inches, or larger, across at the blade edge 35. As illustrated, the blade 33 has a thickness which is considerably less than the thickness of the jaw frame 32, and the blade 33 is affixed to the jaw frame 32 so that the blade 33 is located approximately midway of the thickness of the jaw frame 32.

The blade 33 has a longitudinal replaceable edge portion 34 with a linear knife like edge 35. The edge portion 34 is welded to the blade 33 at 34.1 so that the blade 33 and edge portion 34 are integral with each other and in one piece.

The C-shaped frame includes a tapering nose or beak portion 36 extending downwardly from and forwardly of the blade edge 35. The tapering nose includes a stump retaining face 36.1 to engage and grip a stump for moving it.

An elongate rear portion 37 of the C-shaped frame 32 is recessed and received in a blade frame receiving slot 38 formed longitudinally and centrally in a front end 39 of the top plate 24. The recessed rear portion 37 is mounted on a pivot structure 40 pivotally connected to side plates 25 and 26.

The upper jaw 30 also has an integral attaching rear ear 41 which extends rearwardly and upwardly from the C-shaped frame 32 and is connected to the piston rod 47 of hydraulic cylinder 43. Cylinder 43 is a part of the hydraulic system 42 of the excavator 13, and has a pair of rear ears 43.1 and 43.2 pivotally connected by a mounting pivot 44 to a longitudinally mounted ear 45 rigidly affixed to a rear portion 46 of the top plate 24. A piston rod 47 of the cylinder 43 is operated by fluid flowing through a pair of hoses 47.1 and 47.2. The piston rod 47 includes a piston head 47.3 to which is affixed a pair of ears 48-49 pivotally connected by a pivot structure 50 to the ear 41 of the C-shaped frame 32. Ear 48 extends over a first face 51 of the C-shaped frame 32 and ear 49 extends over an opposing second face 52.

The stationary or lower jaw 31 includes a stump supporting plate 53 rigidly affixed as by welding to the front portions 54, 55 of respective side plates 25, 26 and to the front portion 39 of the top plate 24 and a front tie plate 56. The stump supporting plate 53 includes a oblique rear portion 57 and a front sloping deck portion 58. It will be noted that the deck portion 58 of plate 53 lies in a plane which extends through the axis of pivot 40, and may be said to extend radially from the point 40. The steeper oblique portion 57 has a tapering blade frame receiving slot 59 which cooperates with and is coextensive with blade frame receiving slot 38 formed in the top plate 24. The deck portion 58 also has a longitudinal blade receiving slot 60 for receiving the blade 33. The deck portion 58 of the stump support plate 53 also forms a somewhat rectangular nose receiving opening 61 for receiving the nose 36. The blade receiving slot portions 60 and 61 together define a key hole shaped slot for closely guiding adjacent portions of the upper jaw. Opening 61 cooperates with and is coextensive with slots 60, 59 and 38.

The laterally disposed front tie plate 56 is rigidly affixed to front portions 54-55 and between stump supporting plate 53 and bottom plate 18. Side plates 25 and 26 are set slightly inwardly in the frame 17 so that a lip 61.1 is formed on each side 25-26 of the frame 17 by the front tie plate 56, the rear tie plate 23, the stump support plate 53, the top plate 24, and the bottom plate 18.

Figure 4:
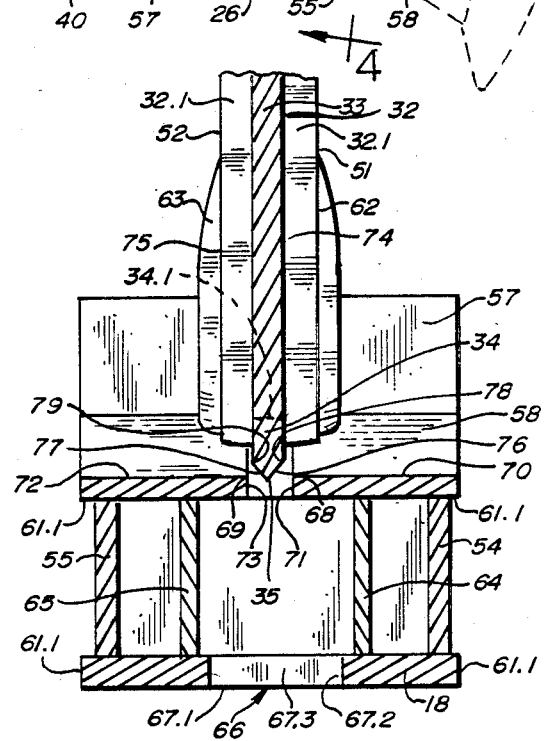
FIG. 4 is a section view at lines 4—4 of FIG. 3.

As shown in FIG. 4, a pair of reinforcing webs or plates 62, 63 are affixed to each of the respective faces 51-52 of the recessed rear portion 37 of the C-shaped frame 32. The webs 62, 63 are mounted to the frame 32 so as to surround the pivot structure 40.

A pair of interior, longitudinally mounted bracing plates 64, 65 are welded between front portion 58 of the stump support plate 53 and the bottom plate 18. The bracing plates 64, 65 are substantially parallel to front portions 54, 55 of side plates 25, 26.

The bottom plate 18 has an outgoing blade and nose receiving slot 66 for allowing outgoing passage of the nose portion 36 and a portion of the blade 33. The slot 66 is formed by side edges 67.1 and 67.2, rear edge 67.3, and a front edge (not shown) of bottom plate 18. The width of slot 66 is slightly less than the width between baffle support plates 64 and 65. The length of the slot 66 or distance between the rear edge 67.3 and the front edge is approximately the same as the length of the radially extending portion 58 of the stump support plate 53.

The stump supporting plate 53 includes cutting edges 68 and 69 which form the blade receiving slot 60. Edge 68 is formed by the intersection of a top face 70 of plate 53 and an inner guide face 71. Edge 69 is formed by the intersection of a top face 72 and an inner guide face 73. Guide faces 71 and 73 may guide the cutting blade 33 and edge 35 and prevent transverse or sideways movement thereof.

The cutting blade 33 has a pair of first and second planar faces 74-75 and a pair of tapering oblique faces 76-77 which taper toward each other to form the slicing knife like edge 35. A first cutting edge 78 is formed by the intersection of planar face 74 and tapering face 76. A second cutting edge 79 is formed by the intersection of planar face 75 and tapering face 77. The thickness of cutting blade 33 or the distance between faces 74-75 is about the same as the width of slot 60 or the distance between inner guide faces 71 and 73.

The C-shaped frame 32 may be formed of steel. The blade 33 may be formed of a high carbon content steel. The replaceable edge portion 34 may be formed of a high carbon content steel having a greater hardness or higher carbon content than the steel forming blade 33.

In operation, as shown in FIGS. 1 and 2, the wood cutting shear attachment 10 is mounted on a boom structure 12 of a hydraulic excavator 13. As shown in FIG. 3, the piston rod 47 of the hydraulic system 42 is retracted so that the upper jaw 30 pivots to an open position. When the upper jaw 30 is disposed in its open position, the lower or stationary jaw 31 is pushed under a stump to be cut. At this point the upper jaw 30 may be closed so that the jaw structure 29 and nose portion 36 grabs the stump to maneuver it into position for cutting. The jaw structure 29 may be opened and closed a number of times until the stump is in position for being cut.

When the stump has been oriented in the jaw structure 29 for cutting, the piston rod 47 is extended to push the movable jaw 30 downwardly and forwardly. The slots 38 and 59 guide the movable jaw 30 as it pivots downwards and forwardly toward the stationary jaw 31. As the knife like edge 35 contacts and brings pressure to bear on the stump in the jaw structure 29, the stump bears against the stump supporting plate 53. After the knife like edge 35 has penetrated, and sliced substantially into the stump, the guiding inner faces 71 and 73 of the guide slot 60 begin to guide the cutting blade 33. The knife like edge 35 progressively enters guide slot 60. Before the entire length of the knife like edge 36 has entered the slot 60, the nose 34 begins to enter the nose receiving opening 61. After the upper or movable jaw 30 has sliced through the stump, the jaw 30 may continue to pivot in a cutting direction to a rest position. The nose 34 may move through the nose receiving opening 66 formed in bottom plate 18 and a portion of the cutting blade 33 may move through the blade receiving slot 67 formed in the plate 18 whereat the movable jaw 30 may come to rest at the rest position.

The cutting edges 78-79 may cooperate with their respective cutting edges 68-69 to assist in shearing or slicing through the stump. One of the cutting edges 78 and 79 may cooperate with its respective edge 68 or 69 to progressively shear the stump or splinters or wooden sections that project from the stump after the knife like edge 35 slices into the stump. Since the thickness of the blade 33 is about the same as the width of the slot 60, both cutting edges 78 and 79 may progressively cooperate with cutting edges 68-69 at the same time to shear the stump or splinters projecting therefrom. It should be noted that if the jaws 30-31 are slightly misaligned, the knife like edge 35 may cooperate with one of the cutting edges 68-69 in a shearing action to shear a stump.

It should further be noted that the movable jaw 30 may split a stump into two pieces. The thick C-shaped frame follows the thin blade 33 into the stump and may wedge the stump apart so that it splits into two pieces before the knife like edge 36 has sliced through the stump.

I claim:

1. A heavy duty attachment for cutting articles such as tree stumps and the like and for connection to the boom structure and hydraulic system of a mobile machine such as a hydraulic excavator, comprising frame means for mounting on the boom structure of such a machine, a jaw structure affixed on the frame means and including a swingable jaw and a stationary jaw, the swingable jaw swinging into the stationary jaw, operating means connected to the swingable jaw and connected to the hydraulic system of such a mobile machine in order to swing the swingable jaw between opened and closed positions relative to the stationary jaw and to bring pressure to bear on such an article, and one of the jaws having a cutting blade with a knife like edge for penetrating into and slicing through an article such as a tree stump, the other jaw having an incoming blade receiving slot receiving the cutting blade, the width of the slot and the thickness of the cutting blade being approximately the same.

2. The attachment of claim 1, wherein the swingable jaw mounts the cutting blade and includes a partially annular jaw frame, the cutting blade being affixed in an inner periphery of the jaw frame.

3. The attachment according to claim 2 wherein the partially annular frame has opposite end portions, the blade edge extending linearly between said opposite end portions.

4. The attachment of claim 2, wherein the partially annular frame includes a nose portion extending beyond the cutting blade for cooperating with the stationary jaw in gripping a tree stump.

5. The attachment of claim 4, wherein the stationary jaw includes a stump supporting section, the stump supporting section having an incoming nose receiving opening for receiving the nose portion of the jaw frame.

6. The attachment of claim 5, wherein the stump supporting section includes an outgoing blade and nose receiving slot for allowing the cutting blade and nose portions respectively to partially extend therefrom when the jaws have been closed such as after a tree stump has been cut.

7. The attachment of claim 1, wherein the cutting blade has shearing edges disposed on either side of cutting blade and the other jaw has cutting edges, the shearing edges progressively entering the other jaw and cooperating with the cutting edges for shearing portions of an article such as a tree stump after the knife like edge has penetrated into the article.

8. The attachment according to claim 2 wherein the cutting blade has a thickness which is less than the thickness of the adjacent jaw frame.

9. A heavy duty attachment for cutting articles such as tree stumps and the like and for connection to the boom structure and hydraulic system of a mobile machine such as a hydraulic excavator, comprising frame means for mounting on the boom structure of such a machine, a jaw structure affixed on the frame means and including a swingable jaw and a stationary jaw, the swingable jaw swinging into the stationary jaw, operating means connected to the swingable jaw and connected to the hydraulic system of such a mobile machine in order to swing the swingable jaw between opened and closed positions relative to the stationary jaw and to bring pressure to bear on such an article, the swingable jaw including a cutting blade and a partially annular jaw frame, the cutting blade being affixed in an inner periphery of the jaw frame and having a knife like edge for penetrating into and slicing through an article such as a tree stump and shearing edges disposed on either side of the cutting blade, the cutting blade having a thickness which is less than the thickness of the partially annular frame, the partially annular frame including opposite end portions, the blade edge extending between said opposite end portions, one of the opposite end portions extending beyond the cutting blade and forming a nose portion for cooperating with the stationary jaw in gripping an article such as a tree stump, and the stationary jaw including a stump supporting section with an incoming blade receiving slot receiving the cutting blade, an incoming nose receiving opening for receiving the nose portion of the jaw frame, and an outgoing blade and nose receiving slot for allowing the cutting blade and nose portions respectively to partially extend therefrom when the jaws have been closed such as after a tree stump has been cut, the width of the incoming blade receiving slot and the thickness of the cutting blade being approximately the same, the incoming blade receiving slot being partially defined by cutting edges, the shearing edges of the cutting blade progressively entering the incoming blade receiving slot and progressively cooperating with the cutting edges of the stump supporting section for shearing portions of an article such as a tree stump after the knife like edge has penetrated into the article.

10. The attachment according to claim 4, wherein the nose portion is tapered for engaging and splitting a stump.

11. The attachment according to claim 8, wherein the cutting blade includes an edge portion which is replaceable by welding.

12. The attachment according to claim 8, wherein a portion of the blade is removable for renewing the edge of the blade.

13. The attachment according to claim 1, wherein a portion of the knife-like edge is linear and a portion of the blade-receiving slot is linear, the linear portions forming an article-receiving angle which is closed as the swingable jaw is closed onto the stationary jaw.

* * * * *

UNITED STATES PATENT AND TRADEMARK OFFICE
CERTIFICATE OF CORRECTION

PATENT NO. : 4,908,946

DATED : March 20, 1990

INVENTOR(S) : Roy E. LaBounty

It is certified that error appears in the above-identified patent and that said Letters Patent is hereby corrected as shown below:

On the title page, under item [19] and in item [76], "Labounty" should be --LaBounty--.

Signed and Sealed this

Thirtieth Day of June, 1992

*Attest:*

DOUGLAS B. COMER

*Attesting Officer*     *Acting Commissioner of Patents and Trademarks*